US006844658B2

(12) United States Patent
Hoshino

(10) Patent No.: US 6,844,658 B2
(45) Date of Patent: Jan. 18, 2005

(54) DRIVE APPARATUS

(75) Inventor: Takayuki Hoshino, Osaka (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 10/284,283

(22) Filed: Oct. 31, 2002

(65) Prior Publication Data

US 2003/0085630 A1 May 8, 2003

(30) Foreign Application Priority Data

Nov. 7, 2001 (JP) .......................................... 2001-341812

(51) Int. Cl.[7] .............................................. H01L 41/09
(52) U.S. Cl. ................................................. 310/316.03
(58) Field of Search ............................. 310/316.03, 317

(56) References Cited

U.S. PATENT DOCUMENTS

| 4,714,935 | A | * | 12/1987 | Yamamoto et al. ............ 347/10 |
| 5,994,929 | A | * | 11/1999 | Sano et al. .................. 327/111 |
| 6,072,362 | A | * | 6/2000 | Lincoln ........................ 330/10 |
| 6,218,765 | B1 | * | 4/2001 | Kawabe ....................... 310/317 |
| 6,433,459 | B1 | * | 8/2002 | Okada .......................... 310/317 |
| 6,628,275 | B2 | * | 9/2003 | Vossen et al. ............... 345/211 |
| 2003/0122735 | A1 | * | 7/2003 | Huang et al. ................. 345/60 |
| 2003/0193454 | A1 | * | 10/2003 | Lee et al. ...................... 345/63 |

FOREIGN PATENT DOCUMENTS

| JP | 2000-350482 | 12/2000 | ............ H02N/2/00 |
| JP | 2001-211669 | 8/2001 | ............ H02N/2/00 |

* cited by examiner

Primary Examiner—Thomas M. Dougherty
(74) Attorney, Agent, or Firm—McDermott Will & Emery LLP

(57) ABSTRACT

In order to provide a drive apparatus where a rush-current is small when a voltage is applied to a capacitive load so that the drive apparatus is driven, the drive apparatus has a capacitive load 22, first drive circuits Q1, Q4 for applying a power source voltage E to the capacitive load 22, second drive circuits Q2, Q3 for applying the power source voltage E to the capacitive load 22 to an opposite direction to the first drive circuits Q1 and Q4, and a control circuit 32 for operating the first and second drive circuits Q1, Q4; Q2, Q3 alternately. Discharging circuits Q5, G1, G2, Q6 which are connected with inductive element G1 and G2 are provided to both ends of the capacitive load 22. The control circuit 32 operates the first and second drive circuits Q1, Q4; Q2, Q3 with an interval, and operates the discharging circuits Q5, G1, G2, Q6 during the interval.

13 Claims, 6 Drawing Sheets

DRIVE APPARATUS

This application is based on application No. JP 2001-341812 filed in Japan, the contents of which is hereby incorporated by reference.

BACKGROUND OF THE INVENTION

1. Field of the Invention

The present invention relates to an improved drive apparatus. More specifically, the invention relates to the improved drive apparatus which is driven by applying an alternating voltage to a capacitive load. As one concrete application example, the capacitive load is an electromechanical transducing element.

2. Description of the Related Art

Conventionally, a drive apparatus using a piezoelectric element is provided. Such a drive apparatus is driven by a drive circuit 70 as shown in FIG. 8, for example. In the drawing, 72 is a control circuit, 122 is a piezoelectric element as a capacitive load, F1 and F3 are P-channel FETs (field-effect transistors) for driving, and F2 and F4 are N-channel FETs for driving.

FIG. 9 is a timing chart showing an operating sequence. FIGS. 9(a) through 9(d) show gate voltages of the respective FETs (F1 through F4) to be controlled by the control circuit 72. FIG. 9(e) shows a voltage to be applied to the piezoelectric element 122. The P-channel FETs (F1 and F3) are energized when the gate voltages are Lo as shown by reference numerals 91 and 93, and when the gate voltages becomes Hi, the P-channel FETs are broken. The N-channel FETs (F2 and F4) are broken when the gate voltages are Lo, and when the gate voltages are Hi as shown by reference numerals 92 and 94, the N-channel FETs are energized. In the case of period T1 in FIG. 9, for example, since F1 and F2 are Hi and F3 and F4 are Lo, only F2 and F3 are energized, and a voltage of +E (V) is applied to the piezoelectric element 122 as shown by a reference numeral 80. On the contrary in the case of period T2, since only F1 and F4 are energized, a voltage of –E (V) is applied to the piezoelectric element 122 as shown by a reference numeral 84. As mentioned above, according to the timing charts in FIG. 9, alternating voltages which are twice as much as a power source voltage E are applied to both ends of the piezoelectric element 2 (for example, see Japanese Patent Application Laid-Open No. 2000-350482), respectively.

FIG. 10 is a timing chart showing an operating sequence of a drive apparatus disclosed in Japanese Patent Application Laid-Open No. 2001-211669, for example. A circuit diagram of the drive apparatus disclosed in this publication is the same as that of FIG. 8. A difference with Japanese Patent Application Laid-Open No. 2000-350482 is that periods S1 and S2 are provided between the periods T1 an T2 and electric charges with which the piezoelectric element 122 is charged are temporarily discharged and are reversely charged. Operating patterns of period T1 and period T2 in FIG. 10 are the same as those of the period T1 and the period T2 shown in FIG. 9. At periods S1 and S2, since F1 through F4 are Hi, only the F2 and F4 are energized, and both ends of the piezoelectric element 122 are short-circuited. Therefore, at period T1 and T2, electric charges with which the piezoelectric element 122 is charged are temporarily discharged at period S1 and S2 as shown by reference numerals 82 and 86, and the piezoelectric element 122 is charged to the opposite direction at nest periods T2 and T1.

Incidentally, the piezoelectric element 122 is a capacitive load for accumulating electric charges. For this reason, in a drive apparatus having the conventional structure, when an applying voltage of the piezoelectric element 122 is switched for driving, there arises a problem that a large rush-current flows and power consumption becomes high.

Namely, in the case of Japanese Patent Application Laid-Open No. 2000-350482, as shown by reference numeral 88 and 89 in FIG. 9(e), since both ends voltages of the piezoelectric element 122 are switched from +E (V) into –E (V) or from –E (V) into +E (V) steeply, a rush-current I becomes as follows:

$$I = 2E/r \quad (1)$$

(r is a general resistance value of an ON resistance of FET, an output resistance of a power source, a line resistance or the like).

In addition, in the case of Japanese Patent Application Laid-Open No 2001-211669, since electric charges of the piezoelectric element 122 are temporarily discharged and the piezoelectric element is charged to the opposite direction, as shown by reference numerals 81, 83, 85 and 87 in FIG. 10(e), a rush-current I becomes as follows:

$$I = E/r \quad (2)$$

(r is a general resistance value of an ON resistance of FET, an output resistance of a power source, a line resistance or the like), namely, the rush-current I is reduced to half, but a suppressing effect of a rush-current is not sufficient.

OBJECTS AND SUMMARY

The present invention tries to solve such problems of the conventional structures, and its object is to provide an improved drive apparatus. More specifically, it is an object of the invention to provide the improved drive apparatus which is driven by applying an alternating voltage to a capacitive load. Concretely, it is an object of the invention to provide the drive apparatus in which a rush-current becomes small when a voltage is applied to the capacitive load so that the drive apparatus is driven.

In order to achieve the above object and another objects, a drive apparatus according to a certain aspect of the present invention includes: a capacitive load; a first drive circuit for applying a power source voltage to the capacitive load; a second drive circuit for applying the power source voltage to the capacitive load to an opposite direction to the first drive circuit; a control circuit for operating the first and second drive circuits alternately; and a discharging circuit where an inductive element is connected to the capacitive load. The control circuit operates the first and second drive circuits with an interval, and operates the discharging circuit during the interval.

In the above structure, a voltage which is twice as much as the power source is applied to the capacitive load such as a piezoelectric element by the first and second drive circuits. After the operation of one of the first and second drive circuits ends, there is an interval until the other one of the first and second drive circuit operates, and the discharging circuit operates during this interval. When the discharging circuit operates, the capacitive load and the inductive element compose a closed circuit so as to be in a resonant state. After a voltage of the capacitive load is inverted due to the resonance, when the other one of the first and second drive circuits is operated, a rush-current can be small when the power source voltage is applied to the capacitive load and the drive apparatus is driven.

Here, when impedance Z of the capacitive load is divided into a real part R (resistance) and an imaginary part X (reactance):

$$Z = R + jX \quad (3)$$

X becomes negative.

In addition, when impedance Z of the inductive element is divided into a real part R (resistance) and an imaginary part X (reactance)

$$Z=R+jX \qquad (4)$$

X becomes positive.

Preferably, the first drive circuit includes: first switching means, one end of which is connected with a power source and the other end of which is connected to one end of the capacitive load; and second switching means one end of which is connected with the other end of the capacitive load and the other end of which is grounded, the second drive circuit includes: third switching means, one end of which is connected with the power source and the other end of which is connected to the other end of the capacitive load; and fourth switching means, one end of which is connected with one end of the capacitive load and the other end of which is grounded, and the discharging circuit is composed of the second and fourth switching means and the inductive element, or the first and third switching means and the inductive element.

In the above structure, the control circuit switches between an energizing state and a breaking state of the switching means. The first and the second switching means are brought into the breaking state, so that the first drive circuit can be operated. Moreover, the third and fourth switching means are brought into the energizing state, so that the second drive circuit can be operated. Moreover, the second and fourth switching means are brought into the energizing state, so that the capacitive load and the inductive element compose a closed circuit to be operated as a discharging circuit. Alternatively, the first and third switching means are brought into the energizing state, the capacitive load and the inductive element compose a closed circuit so as to be operated as a discharging circuit. As the switching means, for example, switching elements such as FET and transistor can be used.

According to the above structure, since it is not necessary to provide the switching means for operating the discharging circuit separately from the drive circuit, the structure of the drive apparatus can be simplified.

In addition, preferably, when an electrostatic capacity of the capacitive load is designated by C and an inductance of the inductive element is designated by L, a length Ts of a period for operating the discharging circuit is set to a value represented as follows:

$$Ts=\pi(LC)^{1/2} \qquad (5)$$

or its approximate value.

With the above structure, a voltage can be applied to the capacitive load at the first peak or its vicinity after the discharging circuit is operated and a voltage of the capacitive load is inverted. As a result, an insufficient voltage can be small as much as possible when a voltage is applied to the capacitive load, thereby driving the drive apparatus efficiently.

In addition, preferably the capacitive load is a piezoelectric element.

In addition, the drive apparatus according to a certain aspect further includes: a driving member, one end of which is fixed to one end of an expansion/contraction direction of the piezoelectric element; an engagement member which engaged with the driving member by a frictional force. The control circuit operates the first and second drive circuits and the discharging circuit so that the piezoelectric element expands and contracts at different speeds according to directions, and relatively moves the driving member or the engagement member.

According to the above structure, in the case where the other end of the expansion/contraction direction of the piezoelectric element or the other end of the driving member is fixed, the engagement member can be relatively moved along the driving member. In the case where the engagement member is fixed, the driving member can be relatively moved along the engagement member.

With the above structure, accurate driving can be executed easily and efficiently.

BRIEF DESCRIPTION OF THE DRAWINGS

These and other objects and features of the present invention will become apparent from the following description of preferred embodiments thereof taken in conjunction with the accompanying drawings, in which.

In the following description, like parts are designated by like reference numbers throughout the several drawings.

DETAILED DESCRIPTION OF THE PREFERRED EMBODIMENTS

There will be explained below a drive apparatus according to embodiments of the present invention with reference to FIGS. 1 through 7.

As the drive apparatus, various types of apparatuses can be constituted by using a piezoelectric element as shown in FIG. 1, for example.

Figure 1A:
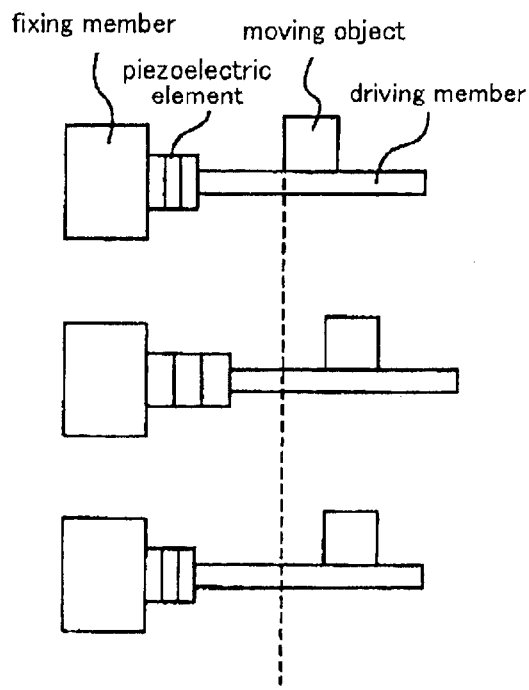
FIGS. 1(a) through 1(e) are explanatory diagrams of a drive apparatus using a piezoelectric element.

FIG. 1(a) shows an element fixed type apparatus. A fixing member is fixed and coupled with one end surface of an expansion/contraction direction of a piezoelectric element, and a driving member is fixed and coupled with the other end surface so that a moving object is engaged with the driving member by a frictional force.

Figure 1B:
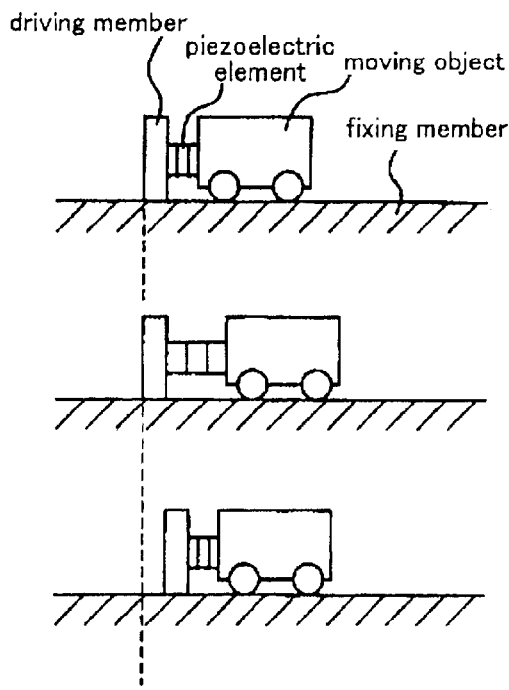

FIG. 1(b) shows a self advancing type apparatus. An moving object is fixed and coupled with one end surface of an expansion/contraction direction of a piezoelectric element, and a driving member is fixed and coupled with the other end surface, so that the driving member is engaged with a fixing member by a frictional force. The moving object is movable along the fixing member.

Figure 1C:
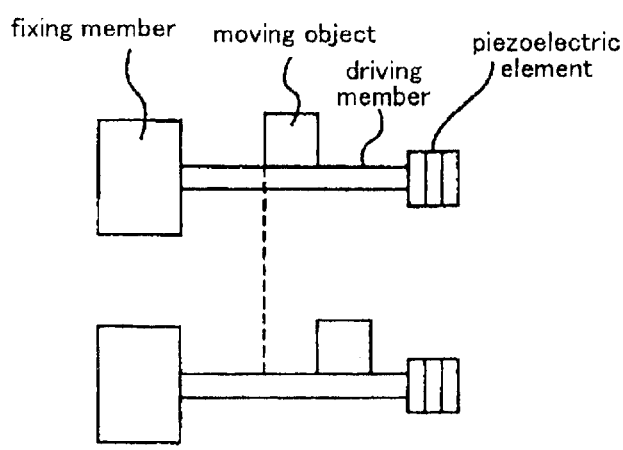

FIG. 1(c) shows a driving member fixed type apparatus. One end surface of a driving member is fixed and coupled with a fixing member, and a piezoelectric element is fixed and coupled with the other end surface, so that a moving object is engaged with the driving member by a frictional force.

Figure 1D:
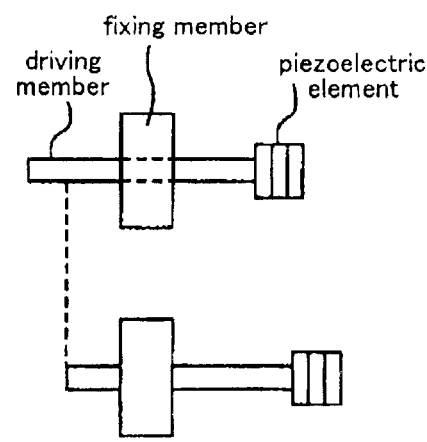

FIG. 1(d) shows a driving member advancing type apparatus. A piezoelectric element is fixed and coupled with one end surface of a driving member, and the driving member is engaged with a fixing member by a frictional force.

Figure 1E:
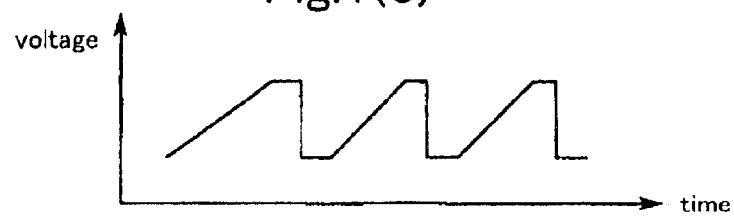

Any types of the drive apparatuses are driven by applying a suitable voltage waveform with a serrate shape, a rectangular shape or the like shown in FIG. 1(e), for example, to a piezoelectric element and expanding and contracting the piezoelectric element at different speeds between expansion and contraction.

Namely, in the case of the element fixed type apparatus, as sown in FIG. 1(a), for example, the piezoelectric element is expanded slowly and the moving object is moved integrally with the driving member. Next, the piezoelectric element is contracted abruptly, and the driving member is returned to an initial position abruptly. At this time, slip occurs between the driving member and the moving object, and the moving object does not substantially move and thus only the driving member returns to the initial position. As a result, the moving object moves from the initial position along the driving member. This cycle is repeated, and the moving object (corresponding to an engagement member) is moved along the driving member.

In the case of the self advancing type apparatus, as shown in FIG. 1(b), for example, when the piezoelectric element is expanded slowly, the moving object moves because a large frictional force exists between the driving member and the fixing member. Next, the piezoelectric element is contracted abruptly. At this time, when a mass of the moving object is sufficiently larger than that of the driving member, slip occurs between the fixing member and the driving member, and thus the driving member moves towards the moving object. As a result, moving unit, namely, the driving member, the piezoelectric element and the moving object move from their initial positions along the fixing member. This cycle is repeated, so that the moving unit including the driving member is moved along the fixing member (corresponding to an engagement member).

In the case of the driving member fixed type apparatus shown in FIG. 1(c), the piezoelectric element is expanded and contracted, and vertical vibration, speeds of which are different according to directions, is generated on the driving member, so that the moving object (corresponding to engagement member) is moved along the driving member to a desired direction.

In the case of the driving member fixed type apparatus shown in FIG. 1(d), the piezoelectric element is expanded and contracted, and vertical vibration, speeds of which are different according to directions, is generated on the driving member, so that the driving member is moved along the fixing object (corresponding to engagement member) to a desired direction.

Figure 2A:
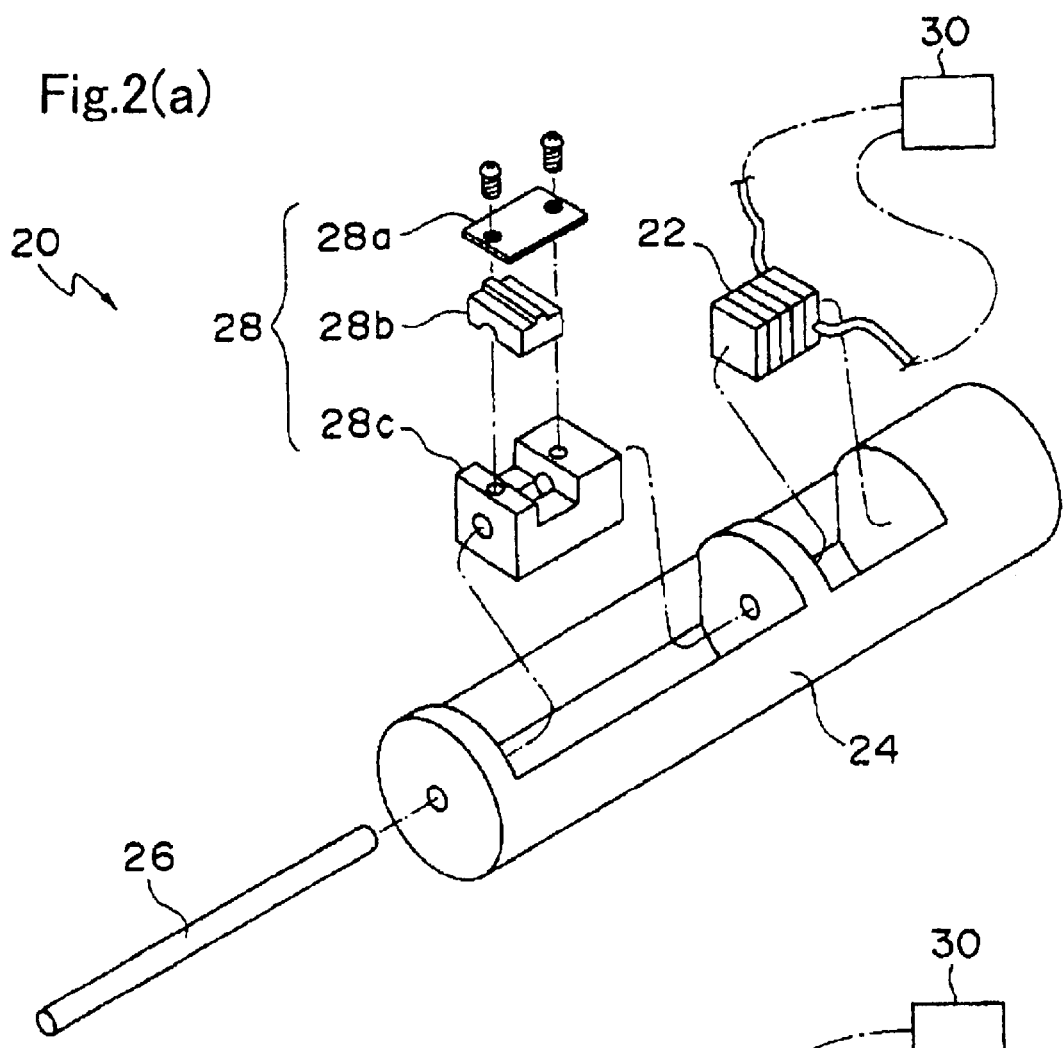
FIGS. 2(a) and 2(b) are exploded perspective views of an element fixed type drive apparatus.
Figure 2B:
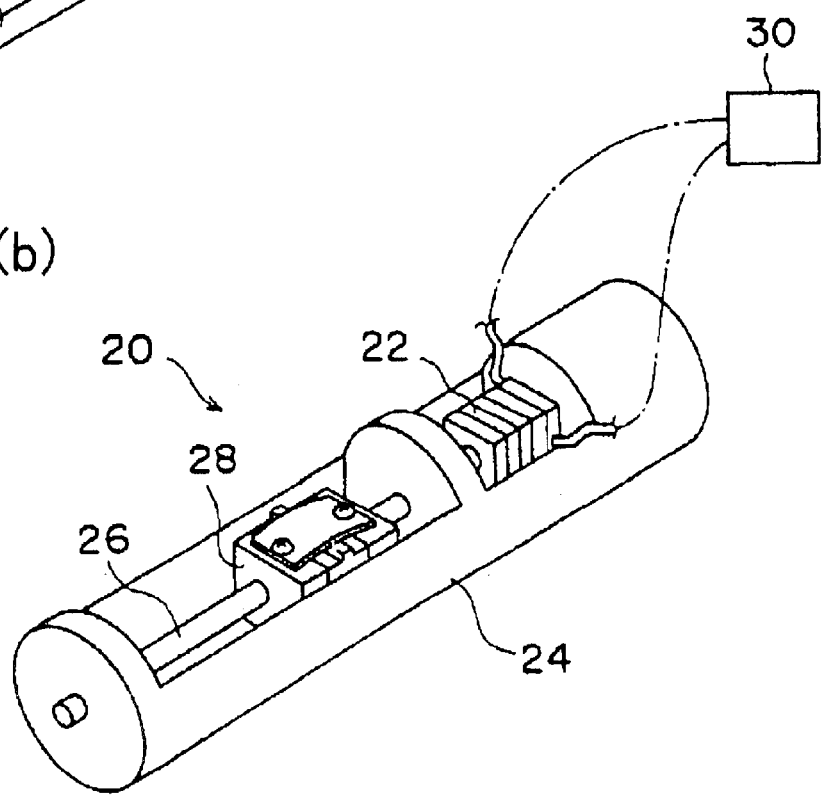

FIGS. 2(a) and 2(b) are exploded perspective views showing concrete structures of an element fixed type drive apparatus 20. The drive apparatus 20 has a fixing member 24, a piezoelectric element 22 having a laminated shape, for example, a driving shaft 26 and a driving unit 28. The fixing member 24 is mounted to a fixing member of an equipment, not shown (for example, base of an XY driving table). The driving shaft 26 is supported to the fixing member 24 slidably. The driving unit 28 is coupled with a driven member, not shown (for example, a stage of the XY drive table). One end surface of an expanding/contraction direction of the piezoelectric element 22 is fixed and coupled with the fixing member 24, and one axial end surface of the driving shaft 26 is fixed and coupled with the other end surface of the expanding/contraction direction. The driving unit 28 which is composed of a slider 28c, a frictional member 28b and a plate spring 28a is engaged wit the driving shaft 26 by a frictional force. This driving apparatus 20 applies a suitable voltage waveform having a serrate shape, a rectangular shape or the like to the piezoelectric element 22 by using the drive circuit 30, and vibrates the driving shaft 26 in a reciprocatory manner to an axial direction, so that the driving unit 28 can be moved to a predetermined direction along the driving shaft 26.

Figure 3:
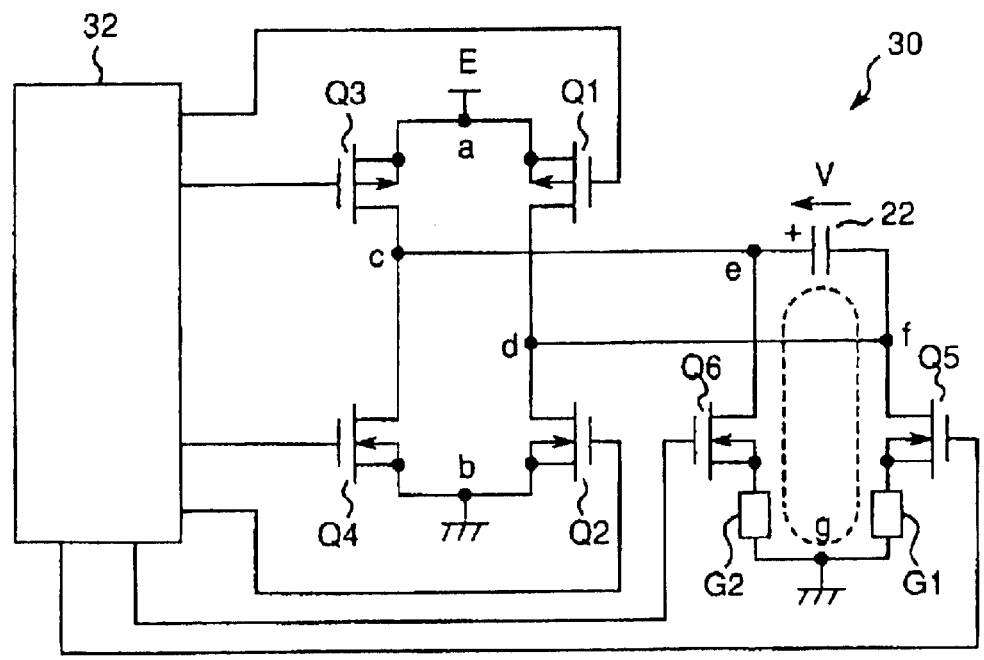
FIG. 3 is a circuit diagram of a drive circuit of the drive apparatus according to a first embodiment of the present invention.

The drive circuit 30 is constituted as shown in a circuit diagram of FIG. 3.

Namely, the drive circuit 30 includes six switching elements Q1, Q2, Q3, Q4, Q5 and Q6, inductive element (for example, coils) G1 and G2, and a control circuit 32. The drive circuit 30 applies a voltage to both ends of the piezoelectric element 22 as a capacitive load.

The switching elements Q1 through Q6 are MOS type FETs, and their gates are connected to the control circuit 32, and a Hi or Lo signal is input thereinto. The switching elements Q1 and Q3 are P-channel FETs, and the switching elements Q2, Q4, Q5 and Q6 are N-channel FETs.

A source of the switching element Q1 and a source of the switching element Q3 are connected to a power source voltage E via a connecting point a. A drain of the switching element Q1 is connected with a drain of the switching element Q2 and one end of the piezoelectric element 22 via a connecting point d. A drain of the switching element Q3 is connected with a drain of the switching element Q4 and the other end of the piezoelectric element 22 via a connecting point c. A source of the switching element Q2 and a source of the switching element Q4 are grounded via a connecting point b.

A drain of the switching element Q5 is connected with one end of the piezoelectric element 22 via a connecting point f. A drain of the switching element Q6 is connected with the other end of the piezoelectric element 22 via a connecting point e. A source of the switching element Q5 is connected with one end of the inductive element G1, and a source of the switching element Q6 is connected with one end of the inductive element G2. The other end of the inductive element G1 and the other end of the inductive element G2 are connected with each other via a grounded connecting point g.

Figure 4:
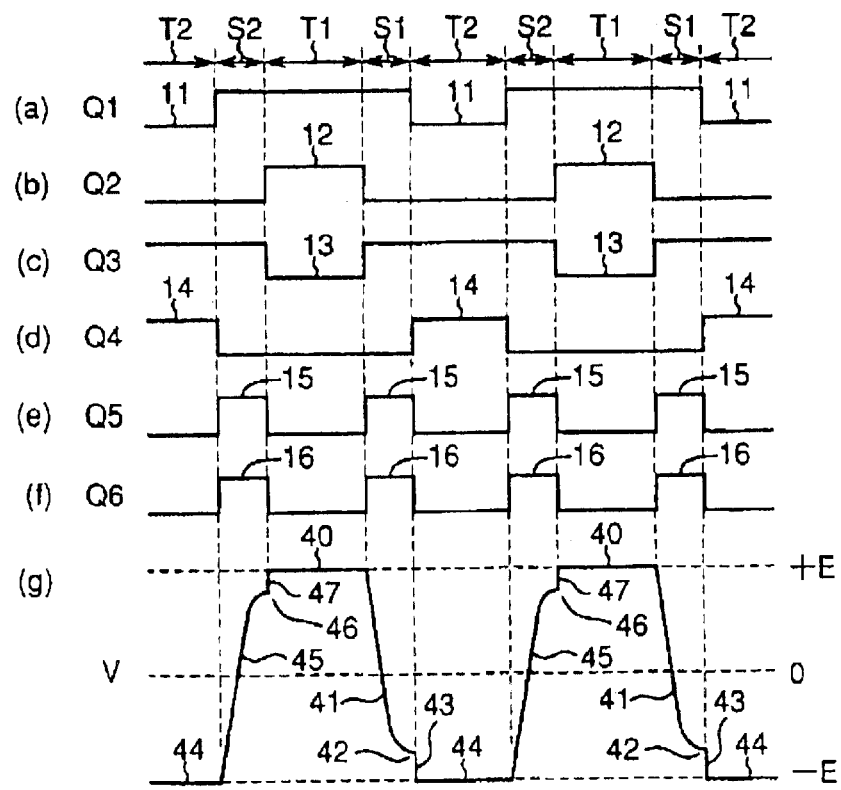
FIG. 4 is a timing chart of the drive circuit in FIG. 3.

Next, there will be explained below an operation of the control circuit 32 with reference to the timing chart of FIG. 4. FIGS. 4(a) through 4(f) show gate voltages of the switching elements Q1 through Q6, and FIG. 4(g) shows both ends voltages of the piezoelectric element 22.

The switching elements Q1 and Q3 as P-channel FETs are in ON state, namely, energized by Lo signals indicated by reference numerals 11 and 13, and the switching elements Q2, Q4, Q5 and Q6 as N-channel FETs are in ON state by Hi signals indicated by reference numerals 12, 14, 15 and 16.

The control circuit 32 repeats the cycle composed of first driving period T1, first discharging period S1, second driving period T2 and second discharging period S2.

At first driving period T1, the switching elements Q5 and Q6 are Lo, namely, in OFF state, namely, broken state, and between the piezoelectric element 22 and the inductive elements G1 and G2 are opened. The switching elements Q1 and Q2 are Hi and the switching elements Q3 an Q4 are Lo. The switching elements Q2 and Q3 are ON and the switching elements Q1 and Q4 are OFF. As a result, one end of the piezoelectric element 22 is grounded via the switching element Q2, and the other end is connected with the power source voltage E via the switching element Q3. Therefore, the both ends voltages V of the piezoelectric element 22 (a direction of an arrow in FIG. 3 is positive) becomes +E as indicated by a reference numeral 40 in FIG. 4(g), electric charges are accumulated at both the ends of the piezoelectric element 22. Namely, the switching elements Q2 and Q3 compose the first drive circuit.

At firs discharging period S1, the switching elements Q1 and Q3 are Hi, and the switching elements Q2 and Q4 are Lo. All the switching elements Q1, Q2, Q3 and Q4 are OFF, so that a voltage is not applied to the piezoelectric element 22. At the same time, the switching elements Q5 and Q6 are Hi, namely, ON, and as shown by a dotted line in FIG. 3, a closed circuit in which the piezoelectric element 22 and the inductive elements G1 and G2 are connected, namely, discharging circuit is formed. When the first discharging period S1 starts, the electric charges accumulated at the other end of the piezoelectric element 22 move to an opposite pole via the switching elements Q6, the inductive element G2, the inductive element G1 and the switching element G1, and as shown by a reference numeral 41 in FIG. 4(g), the both ends voltages of the piezoelectric element 22 is lowered from +E. At this time, the both ends voltages of the piezoelectric element 22 are inverted by resonance due to inductive components of the inductive elements G1 and G2 and capacitive component of the piezoelectric element 22. When the voltages reach a negative peak of the resonance shown by a reference numeral 42 or reach its vicinity, the first discharging period S1 ends. The negative peak does not reach −E due to ON resistance of the switching elements Q5 and Q6, line resistance or the like.

More specifically, a capacity of the piezoelectric element 22 is designated by C, and a total inductance of the inductive elements G1 and G2 is designated by L. When resistance such as ON resistance of the switching elements Q5 and Q6 is ignored, an action of the both ends voltages Ec of the piezoelectric element 22 for the first discharging period S1 can be represented by the following equation:

$$Ec = E\cos\frac{1}{\sqrt{LC}}t \qquad (6)$$

Namely, Ec is +E at time t=0, but Ec becomes −E at time t=π√(LC)=π(LC)$^{1/2}$, namely, the electric charges, with which the piezoelectric element 22 is charged to the positive direction, are inverted, so that the-piezoelectric element 22 is charged with electric charges to the negative direction. Actually, Ec does not reach −E due to ON resistance or the like of the switching elements Q5 and Q6, and obtains a value in the range of 0 to −E. The first discharging period S1 ends, and at the moment when the time goes to the second driving period T2, mentioned later, only insufficient electric charges are supplied from the power source voltage. The time of the first discharging period S1 is π√(LC) or its approximate value. As a result, the time goes to the second driving period T2 at timing that the both ends voltages of the piezoelectric element 22 reach the negative peak, and insufficient electric charges which should be supplied from the power source voltage can be reduced as much as possible, thereby driving the drive apparatus efficiently.

At the second driving period T2, the switching elements Q5 and Q6 are Lo, namely, OFF, and between the piezoelectric element 22 and the inductive elements G1 and G2 is opened. The switching elements Q1 and Q2 become Lo, and the switching elements Q3 and Q4 become Hi. The switching elements Q1 and Q4 are ON, and the switching elements Q2 and Q3 are OFF. As a result, one end of the piezoelectric element 22 is connected with the power source voltage E via the switching element Q1, and the other end is grounded via the switching element Q4. Therefore, the both ends voltages V of the piezoelectric element 22 face the opposite direction to the arrow of FIG. 3, and a voltage −E is applied to the piezoelectric element 22. As a result, just after the second driving period T2 starts, as shown by a reference numeral 43 in FIG. 4(g), the voltages of the piezoelectric element 22 changes up to −E abruptly and thereafter becomes −E as shown by a reference numeral 44. Namely, the switching elements Q1 and Q4 compose a second drive circuit.

At the second discharging element S2, the switching elements Q1 and Q3 become Hi, and the switching elements Q2 and Q4 become Lo. All the switching elements Q1, Q2, Q3 and Q4 are OFF, and a voltage is not applied to the piezoelectric element 22. At the same time, the switching elements Q5 and Q6 become Hi, namely, ON, and as shown by a dotted line in FIG. 3, a closed circuit where the piezoelectric element 22 and the inductive elements G1 and G2 are connected, namely, a discharging circuit is again formed. When the second discharging period S2 starts, the electric charges accumulated at the piezoelectric element 22 move to the opposite pole, and as shown by a reference numeral 45 in FIG. 4(g), the voltages of the piezoelectric element 22 rise from −E. When the voltages reach a positive peak of the resonance shown by a reference numeral 46 or its vicinity, the second discharging period S2 ends. Similarly to the first discharging period S1, the time of the second discharging period S2 is π√(LC) or obtains its approximate value.

Again at the first driving period T1, as mentioned above, the switching elements Q5 and Q6 become Lo, namely, OFF, and between the piezoelectric element 22 and the inductive elements G1 and G2 is opened, and a voltage +E is applied to both ends of the piezoelectric element 22. As a result, just after the first driving period T1 starts, as shown by a reference numeral 47 in FIG. 4(g), the voltage of the piezoelectric element 22 changes up to +E abruptly and thereafter becomes +E as shown by a reference numeral 40.

Hereinafter, the same operation is repeated.

When the driving is carried out in the above manner, in the case where a voltage is applied to the piezoelectric element 22, only insufficient voltage is applied as shown by reference numerals 43 and 47 in FIG. 4(f), and a rush-current at this time becomes small. As a result, the drive apparatus can be driven efficiently.

Figure 8:
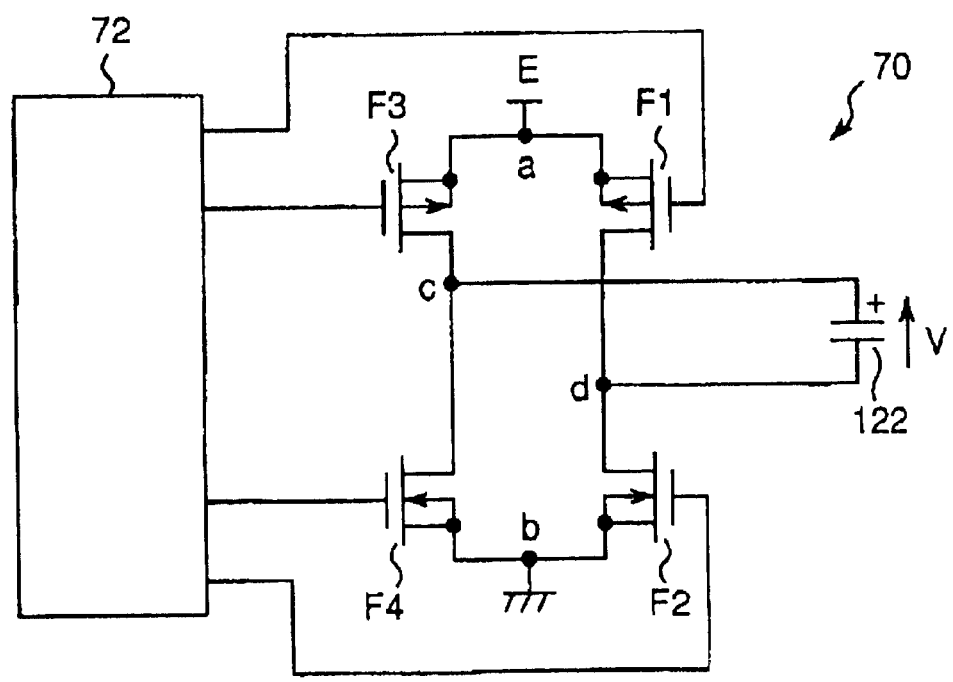
FIG. 8 is a circuit diagram of the drive circuit of a conventional drive apparatus.
Figure 9:
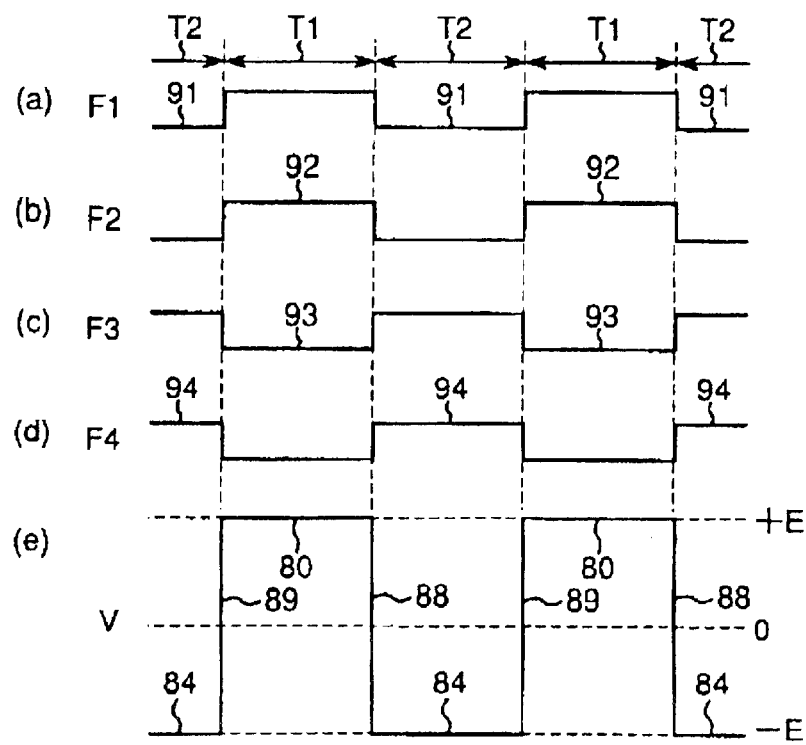
FIG. 9 is a timing chart in a conventional example of the drive circuit in FIG. 8.
Figure 10:
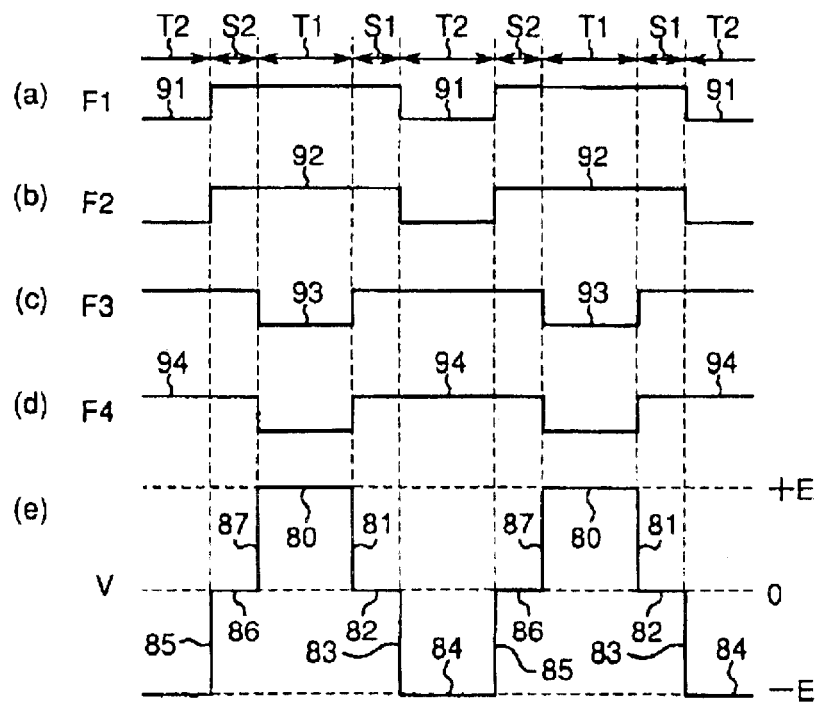
FIG. 10 is a timing chart in a conventional example different from FIG. 9.

In a drive circuit 30 of FIG. 3, for example, when a capacitance of the piezoelectric element 22 is 0.1 μF, inductances of the inductive elements G1 and G2 are 1 μH and a driving frequency is 50 kHz, the power consumption becomes about ⅓ of that of the conventional examples in FIGS. 8 through 10.

When the two inductive elements G1 and G2 are used, the drive apparatus can be driven to two directions in the same manner, and thus the control becomes easy, but only one of the inductive elements G1 and G2 can be used.

Next, there will be explained below the drive apparatus according to a second embodiment of the present invention with reference to FIGS. 5 and 6.

The drive apparatus according to the second embodiment is constituted approximately similarly to the drive apparatus of the first embodiment, but there is a difference such that the switching elements Q5 and Q6 in FIG. 3 are omitted and the switching elements Q2 and Q4 serve also as them. The following will mainly explain the different point using the like reference numerals for the like components.

Figure 5:
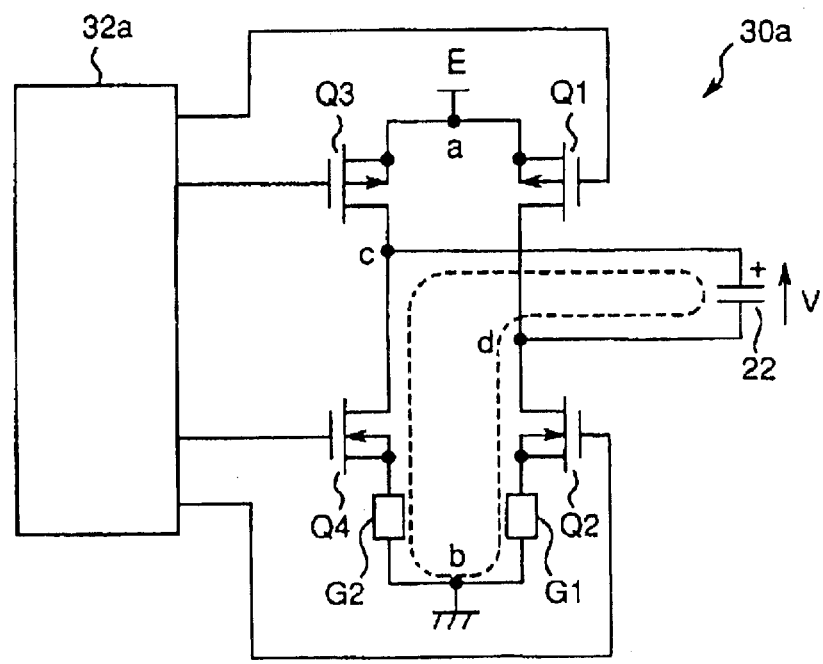
FIG. 5 is a circuit diagram of the drive circuit of the drive apparatus according to a second embodiment of the present invention.

FIG. 5 shows a drive circuit 30a of the drive apparatus according to the second embodiment. The drive circuit 30a omits a switching element for a discharging circuit and includes four switching elements Q1, Q2, Q3 and Q4, inductive elements G1 and G2 and a control circuit 32a. The switching elements Q1 through Q4 compose the first and second drive circuits approximately similarly to the first embodiment. Differently from the first embodiment, the inductive element G1 is connected in a series between a source of the switching element Q2 and a connecting point b. Moreover, the inductive element G2 is connected in a series between a source of the switching element Q4 and a connecting point b.

Next, there will be explained below an operation of the control circuit 32a with reference to a timing chart in FIG. 6. FIGS. 6(a) through 6(d) show gate voltages of the switching elements Q1 through Q4, and FIG. 6(e) shows the both ends voltages of the piezoelectric element 22.

When the switching elements Q1 and Q3 which are P-channel FETs are Lo, they are ON as shown by reference numerals 11 and 13, and when the switching elements Q2 and Q4 which are N-channel FETs are Hi, they are ON as shown by reference numerals 12 and 14.

The control circuit 32a repeats the cycle composed of first driving period T1, first discharging period S1, second driving period T2 and second discharging period S2.

At the first driving period T1, the switching elements Q1 and Q2 become Hi and the switching elements Q3 and Q4 become Lo. The switching elements Q2 and Q3 are ON, and the switching elements Q1 and Q4 are OFF. As a result, one end of the piezoelectric element 22 is grounded via the switching element Q2 and the inductive element G1, and the other end is connected with the power source voltage E via the switching element Q3. Electric charges are accumulated at both the ends of the piezoelectric element 22, and the both ends voltages of the piezoelectric element 22 finally become +E as shown by a reference numeral 50 in FIG. 6(e).

At the first discharging period S1, all the switching elements Q1 through Q4 become Hi, the switching elements Q1 and Q3 are OFF and the switching elements Q2 and Q4 are ON. As a result, as shown by the dotted line in FIG. 5, the piezoelectric element 22 and the inductive elements G1 and G2 are connected so as to form a closed circuit. Since the closed circuit is a resonating circuit including a capacitive component and an inductive component, as shown by a reference numeral 51 in FIG. 6(e), the voltages of the piezoelectric element 22 are lowered from +E. When voltages reach a negative peak of the resonance shown by a reference numeral 52 or its vicinity, the first discharging period S1 ends. Namely, a length of the first discharging period S1 is approximately half of a resonating cycle. The negative peak does not reach −E due to ON resistance of the switching elements Q2 and Q4 or the like.

At the second driving period T2, the switching elements Q1 and Q2 become Lo and the switching elements Q3 and Q4 become Hi, and the switching elements Q1 and Q4 are ON and the switching elements Q2 and Q3 are OFF. As a result, one end of the piezoelectric element 22 is connected with the power source voltage E via a switch terminal Q1, and the other end is grounded via the switching element Q4 and the inductive element G2. Just after the second driving period T2 starts, as shown by a reference numeral 53 in FIG. 6(e), the voltages of the piezoelectric element 22 change gradually up to −E due to an influence of the inductive element G2 and become −E as shown by a reference numeral 54.

At the second discharging period S2, all the switching elements Q1 through Q4 become Hi, and the switching elements Q1 and Q3 are OFF and the switching elements Q2 and Q4 are ON. As a result, as shown by the dotted line in FIG. 5, the piezoelectric element 22 and the inductive elements G1 and G2 are connected so as to form the closed circuit again. Since the closed circuit is a resonating circuit including a capacitive component and an inductive component, as shown by a reference numeral 55, the voltages of the piezoelectric element 22 rise from −E. When the voltages reach a positive peak of the resonance shown by a reference numeral 56 or its vicinity, the second discharging period S2 ends. Namely, a length of the second discharging period S2 is approximately half of a resonating cycle. The positive peak does not reach +E due to ON resistance of the switching elements Q2 and Q4 or the like.

Again at the first driving period T1, the switching elements Q1 and Q2 become Hi and the switching elements Q3 and Q4 become Lo, and the switching elements Q2 and Q3 are ON and the switching elements Q1 and Q4 are OFF. As a result, one end of the piezoelectric element 22 is grounded via the switching element Q2 and the inductive element G1, and the other end is connected with the power source voltage E via the switching element Q3. Just after the first driving period T1 starts, as shown by a reference numeral 57, the voltages of the piezoelectric element 22 change gently up to +E due to an influence of the inductive element G2 and becomes +E as shown by a reference numeral 50.

Hereinafter, the similar operation is repeated.

In the second embodiment, at the moment when the driving periods T1 and T2 are switched into the discharging periods S1 and S2, as shown by reference numerals 53 and 57 in FIG. 6(e), the both ends voltages of the piezoelectric element 22 have gentle inclination. When the driving frequency is high or a duty ratio is small, the piezoelectric element 22 is not soon charged to the power source voltage E, but the similar effect to that in the first embodiment can be achieved by less number of switching elements.

Here, when two inductive elements G1 and G2 are used, the drive apparatus can be driven to two directions in like the manner, thereby facilitating control, but only one of them can be used.

In addition, the inductive elements G1 and G2 are, connected between the connecting point a and the sources of the switching elements Q1 and Q3 in a series, and the switching elements Q1 and Q3 are On at the first and second discharging periods S1 and S2, so that a closed circuit where the piezoelectric element 22 and the inductive elements G1 and G2 are connected may be formed.

Next, there will be explained below the drive apparatus according to a third embodiment of the present invention with reference to FIG. 7.

Figure 7:
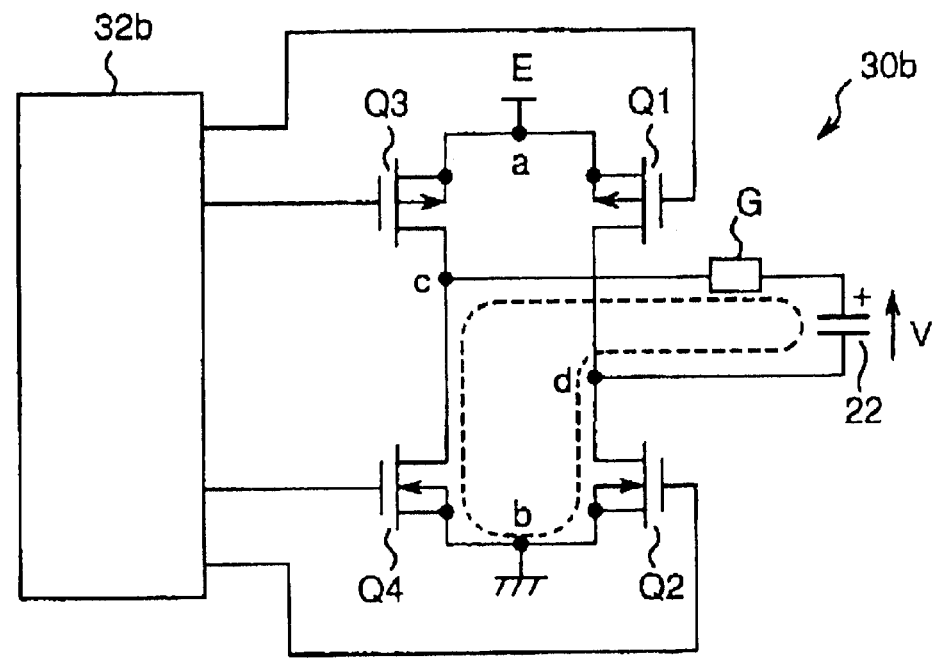
FIG. 7 is a circuit diagram of the drive circuit of the drive apparatus according to a third embodiment of the present invention.

As shown in FIG. 7, a drive circuit 30b of the drive apparatus according to the third embodiment is constituted approximately similarly to the drive apparatus according to the second embodiment, but configurations of discharging circuits are different from each other. There will be mainly describes a different point by using like reference numbers for like parts.

Namely, four switching elements Q1 through Q4 are used so as to configure the first and second drive circuits approximately similarly to the first and second embodiments. Differently from the first and second embodiments, a discharging circuit includes only one inductive element G which is connected between the other end of the piezoelectric element and a connecting point c in a series.

Figure 6:
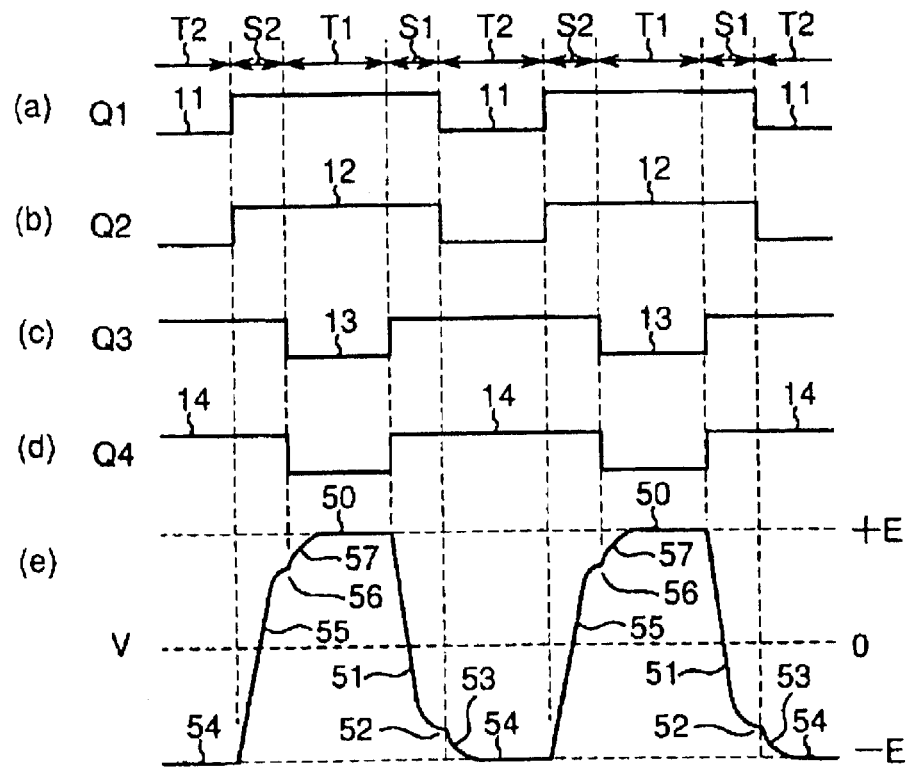
FIG. 6 is a timing chart of the drive circuit in FIG. 5.

A control circuit 32b operates similarly to the second embodiment, and its timing chart is similar to FIG. 6.

Namely, at the first driving period T1, the switching elements Q2 and Q3 are ON, and the switching elements Q1 and Q4 are OFF. As a result, one end of the piezoelectric element 22 is grounded via the switching element Q2, and the other end is connected with the power source voltage E via the inductive element G and the switching element Q3. Electric charges are accumulated at both ends of the piezoelectric element 22, so that both ends voltages of the piezoelectric element 22 finally become +E.

At the first discharging period S1, the switching elements Q1 and Q3 are OFF, and the switching elements Q2 and Q4 are ON, so that a closed circuit where the piezoelectric element 22 and the inductive element G are connected is formed. The voltages of the piezoelectric element 22 are lowered from +E. When the voltages reach a negative peak of resonance or its vicinity, the first discharging period S1 ends. Namely, a length of the first discharging period S1 is approximately half of the resonating cycle. The negative peak does not reach −E due to ON resistance of the switching elements Q2 and Q4 or the like.

At the second driving period T2, the switching elements Q1 and Q4 are ON and the switching elements Q2 and Q3 are OFF. As a result, one end of the piezoelectric element 22 is connected with the power source voltage E via the switching element Q1, and the other end is grounded via the inductive element G and the switching element Q4. Just after the second driving period T2 starts, the voltages of the piezoelectric element 22 change gradually up to −E due to an influence of the inductive element G and become −E.

At the second discharging period S2, the switching elements Q1 and Q3 are OFF, and the switching elements Q2 and Q4 are ON. As a result, as shown by a dotted line in FIG. 7, a closed circuit where the piezoelectric element 22 and the inductive element G are connected is formed, and the voltages of the piezoelectric element 22 rise from −E. When the voltages reach a negative peak of resonance or its vicinity, the second discharging period S2 ends. Namely, a length of the second discharging period S2 is approximately half of the resonating cycle. The negative peak does not reach +E due to ON resistance of the switching elements Q2 and Q4 or the like.

Again at the first driving period T1, the switching elements Q2 and Q3 are ON, and the switching elements Q1 and Q4 are OFF. As a result, one end of the piezoelectric element 22 is grounded via the switching element Q2, and the other end is connected with the power source voltage E via the inductive element G1 and the switching element Q3. Just after the first driving period T1 starts, the voltages of the piezoelectric element 22 change gently up to +E due to an influence of the inductive element G and thereafter become +E.

Hereinafter, the similar operation is repeated.

In the third embodiment, similarly to the second embodiment, since the piezoelectric element 22 and the inductive element G form a series circuit, when the driving frequency is high or duty ratio is small, the piezoelectric element 22 is not immediately charged up to the power source voltage E, but a number of parts can be reduced.

Here, the inductive element G may be connected between one end of the piezoelectric element 22 and the connecting point d in a series.

Here, the present invention is not limited to the above embodiments, and the invention can be carried out in another various forms.

For example, FET is used as a switching element, but another switching elements such as bipolar transistor and junction type FET may be used.

In addition, the present invention can be applied to a drive apparatus which is driven by utilizing a twist strain of a piezoelectric element. The present invention can be provided also to a drive apparatus where the capacitive load is not limited to a piezoelectric element and another capacitive load such as an electrostatic actuator is used.

As mentioned above, according to the present invention, resonance due to an inductive component of an inductive element and a capacitive component of a capacitive load is utilized and electric charges accumulated in the capacitive load are approximately inverted so as to be used for next driving. For this reason, only insufficient electric charges for a power source voltage may be supplied from a power source. Therefore, driving where a rush-current is less and power consumption is low can be realized.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A drive apparatus comprising:

a capacitive load;

a first drive circuit for applying a power source voltage to the capacitive load;

a second drive circuit for applying the power source voltage to the capacitive load to an opposite direction to the first drive circuit;

a control circuit for operating the first and second drive circuits alternately; and a discharging circuit including an inductive element being connected to the capacitive load, wherein the control circuit operates the first and second drive circuits with an intervals, and during said interval, there is no operation of said first and second drive circuits while there is operation of the discharging circuit.

2. A drive apparatus comprising:

a capacitive load;

a first drive circuit for applying a power source voltage to the capacitive load;

a second drive circuit for applying the power source voltage to the capacitive load to an opposite direction to the first drive circuit;

a control circuit for operating the first and second drive circuits alternately; and a discharging circuit including an inductive element being connected to the capacitive load, wherein the control circuit operates the first and second drive circuits with an interval, and operates the discharging circuit during the interval, and a length Ts of a period for operating the discharging circuit is set to a value represented as follows:

$$Ts = \pi(LC)^{1/2}$$

or its approximate value, wherein C represents an electrostatic capacity of the capacitive load; L represents an inductance of the inductive element.

3. A drive apparatus comprising a capacitive load;

a first drive circuit for applying a power source voltage to the capacitive load;

a second drive circuit for applying the power source voltage to the capacitive load to an opposite direction to the first drive circuit;

a control circuit for operating the first and second drive circuits alternately; and a discharging circuit including an inductive element being connected to the capacitive load, wherein the control circuit operates the first and second drive circuits with an interval, and operates the discharging circuit during the interval, and the capacitive load is a piezoelectric element.

4. The drive apparatus according to claim 3 further comprising:

a driving member, one end of which is fixed to one end of an expansion/contraction direction of the piezoelectric element; and an engagement member which engaged with the driving member by a frictional force, wherein the control circuit operates the first and second drive circuits and the discharging circuit so that the piezoelectric element expands and contracts at different speeds according to directions, and relatively moves the driving member or the engagement member.

5. A drive apparatus comprising:
a capacitive load;
a first drive circuit for applying a power source voltage to the capacitive load, said first drive circuit includes:
   first switching means, one end of which is connected with a power source and the other end of which is connected to one end of the capacitive load; and
   second switching means, one end of which is connected with the other end of the capacitive load and the other end of which is grounded through first inductive element;
a second drive circuit for applying the power source voltage to the capacitive load to an opposite direction to the first drive circuit, said second drive circuit includes:
   third switching means, one end of which is connected with the power source and the other end of which is connected to the other end of the capacitive load; and
   fourth switching means, one end of which is connected with one end of the capacitive load and the other end of which is grounded through second inductive element;
a control circuit for operating the first and second drive circuits alternately; and
a discharging circuit composing of the second and fourth switching means and the first and second inductive element, is connected to both ends of the capacitive load,
wherein the control circuit operates the first and second drive circuits with an interval, and operates the discharging circuit during the interval.

6. The drive apparatus according to claim 5,
wherein a length Ts of a period for operating the discharging circuit is set to a value represented as follows:

$$Ts = \pi(LC)^{1/2}$$

or its approximate value, wherein C represents an electrostatic capacity of the capacitive load; L represents an inductance of the inductive element.

7. The drive apparatus according to claim 5, wherein the capacitive load is a piezoelectric element.

8. The drive apparatus according to claim 7 further comprising:
a driving member, one end of which is fixed to one end of an expansion/contraction direction of the piezoelectric element; and
an engagement member which engaged with the driving member by a frictional force, wherein
the control circuit operates the first and second drive circuits and the discharging circuit so that the piezoelectric element expands and contracts at different speeds according to directions, and relatively moves the driving member or the engagement member.

9. A drive apparatus having a driving member, one end of which is fixed to one end of an expansion/contraction direction of a piezoelectric element and an engagement member which engaged with the driving member by a frictional force, the drive apparatus comprising:
a capacitive load including the piezoelectric element;
a first drive circuit for applying a power source voltage to the capacitive load;
a second drive circuit for applying the power source voltage to the capacitive load to an opposite direction to the first drive circuit;
a control circuit for operating the first and second drive circuits alternately; and
a discharging circuit including an inductive element being connected to the capacitive load,
wherein the control circuit operates the first and second drive circuits and the discharging circuit so that the piezoelectric element expands and contracts at different speeds according to directions, and relatively moves the driving member or the engagement member, and
wherein the control circuit operates the first and second drive circuits with an interval, and operates the discharging circuit during the interval.

10. The drive apparatus according to claim 9, wherein
the first drive circuit includes:
   first switching means, one end of which is connected with a power source and the other end of which is connected to one end of the capacitive load; and
   second switching means, one end of which is connected with the other end of the capacitive load and the other end of which is grounded,
the second drive circuit includes:
   third switching means, one end of which is connected with the power source and the other end of which is connected to the other end of the capacitive load; and
   fourth switching means, one end of which is connected with one end of the capacitive load and the other end of which is grounded, and
the discharging circuit is composed of the second and fourth switching means and the inductive element, or the first and third switching means and the inductive element.

11. The drive apparatus according to claim 10,
wherein the second and fourth switching means are connected with the inductive element in parallel relationship.

12. The drive apparatus according to claim 10, wherein the capacitive load is connected with the inductive element in series relationship.

13. The drive apparatus according to claim 9,
wherein a length Ts of a period for operating the discharging circuit is set to a value represented as follows:

$$Ts = \pi(LC)^{1/2}$$

or its approximate value, wherein C represents an electrostatic capacity of the capacitive load; L represents an inductance of the inductive element.

* * * * *